United States Patent

[11] 3,634,635

[72] Inventor Alan Elgar Herbert Ellis
Colchester, England
[21] Appl. No. 19,039
[22] Filed Mar. 12, 1970
[45] Patented Jan. 11, 1972
[73] Assignee Ellis (Colchester) Limited
Colchester, England
[32] Priority Mar. 13, 1969
[33] Great Britain
[31] 13,212/69

[54] APPARATUS FOR DETERMINING THE LOAD ON A WHEEL AXLE IN A VEHICLE
12 Claims, 3 Drawing Figs.

[52] U.S. Cl............................................... 200/52,
200/84 C, 340/52, 335/205
[51] Int. Cl............................................... H01h 35/02
[50] Field of Search......................................... 200/61.2,
61.21, 61.41–61.44, 5 E, 84 C, 52; 335/205;
340/52, 282

[56] References Cited
UNITED STATES PATENTS

| 2,586,137 | 2/1952 | Yoder et al. | 340/52 |
| 2,769,967 | 11/1956 | Lukocevich | 340/52 |
| 2,779,013 | 1/1957 | Chotro | 340/52 |
| 2,843,686 | 7/1958 | Ballou | 200/5 E X |
| 2,976,378 | 3/1961 | Goddard | 200/84 C X |
| 3,404,809 | 10/1968 | Harris et al. | 335/205 X |
| 3,419,877 | 12/1968 | Roth | 335/205 X |
| 3,447,109 | 5/1969 | Shlesinger, Jr. | 335/205 |

Primary Examiner—J. R. Scott
Attorney—Watson, Cole, Grindle & Watson

ABSTRACT: An axle load detector comprises a post carrying at least one magnetically operated switch at a local position along its length, a separate body incorporating a magnet for operating the switch and means for mounting the body and post, one on a vehicle chassis and one on an axle of the vehicle. Progressive deflection of the axle spring causes the body to move along the post and operate the switch at a spring deflection corresponding to a given axle load.

PATENTED JAN 11 1972

3,634,635

INVENTOR
ALAN E H ELLIS

BY
Watson, Cole, Grindle & Watson
ATTORNEY

APPARATUS FOR DETERMINING THE LOAD ON A WHEEL AXLE IN A VEHICLE

This invention is an axle load detector for a vehicle, which detector can be simply made and fitted to an existing vehicle.

According to the invention the detector comprises a post carrying at least one magnetically operated switch at a local position along its length, a separate body incorporating a magnet for operating the switch and means for mounting the body and post, one on a vehicle chassis and one on an axle of the vehicle.

The post and body will normally be mounted so that the body moves in a vertical path close to the length of the post as the axle spring progressively deflects. There need be no physical contact between the post and the body, and so no bearing which is liable to wear.

The switches can be arranged in indicating circuits so that the driver can see as the vehicle is being loaded when he is approaching, or has exceeded the maximum axle load.

The switches can be adjustable along the length of the post in accordance with the vehicle characteristics, and the load permitted.

The invention may be carried into practice in various ways and one embodiment will be described by way of example with reference to the accompanying drawings in which.

The load on the axle 11 of a vehicle can be detected by detecting the vertical displacement between the chassis 12 and the axle 11 as the conventional leaf spring 13 deflects with increasing load. The device according to the present invention is not concerned with giving an absolute indication of whatever load is carried on the axle but merely with giving an indication when the load approaches or exceeds a certain safe value.

Figure 1:
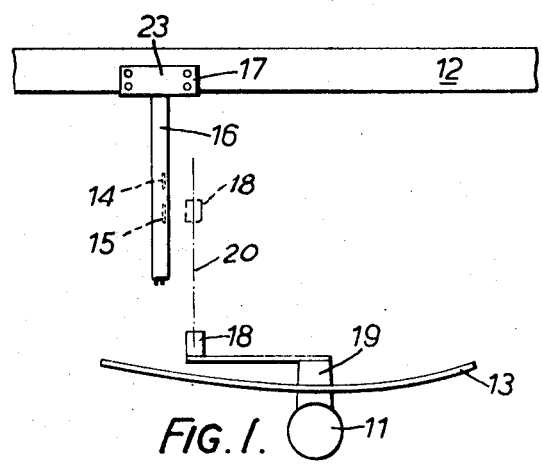
FIG. 1 is a diagram showing how the axle load detector is mounted on a vehicle.

For this purpose two magnetically operated reed switches 14 and 15 are positioned at preset different vertical positions in a post 16 secured to the chassis at 17 and these can be operated to close two different electrical circuits when a permanent magnet embodied in a glass fiber capsule 18 carried on a part of the axle 19 passes in close proximity to them. In the unloaded position shown in FIG. 1 the body 18 is out of the range of the post 16 but as the load increases and the spring 13 deflects the magnet will first move past the switch 15 to operate that switch and give a preliminary warning and then will move along the line 20 past the switch 14 which would indicate that the load is too great and will have to be reduced or rearranged.

In general there will be four detectors one at each end of front and rear axles so that uneven distribution from side to side and from front to back can be indicated and possibly the load can be brought within the required limits merely by redistributing it over the chassis.

The post comprises a metal tube 21 having a nylon, plastics, metal, or glass fiber bung 22 fitted into each end. The upper end is externally threaded so that it can be secured in an aperture in a connection box 23 by nuts 24. The connection box 23 not only serves to house connections to electrical conductors from the switches 14 and 15 to the cab of the vehicle and to an indicating position at the tail but also has means for securing the post to the chassis as indicated generally at 17 in FIG. 1.

The cylindrical space within the tube 21 contains two molded glass fiber bodies 25 and 26. Each is of semicircular cross section so that the two together are an easy slide fit within the tube but each can slide longitudinally in relation to the other. Each body has embedded in it one of the reed switches 14 or 15 so that by adjusting the body the switch can be adjusted along the length of the post 16.

Each body 25 or 26 is guided to move longitudinally along two rods, a plain guide rod 27 extending with slight clearance through the body and into blind holes in the two bungs 22 and a threaded rod 28 for permitting the longitudinal adjustment.

Figure 2:
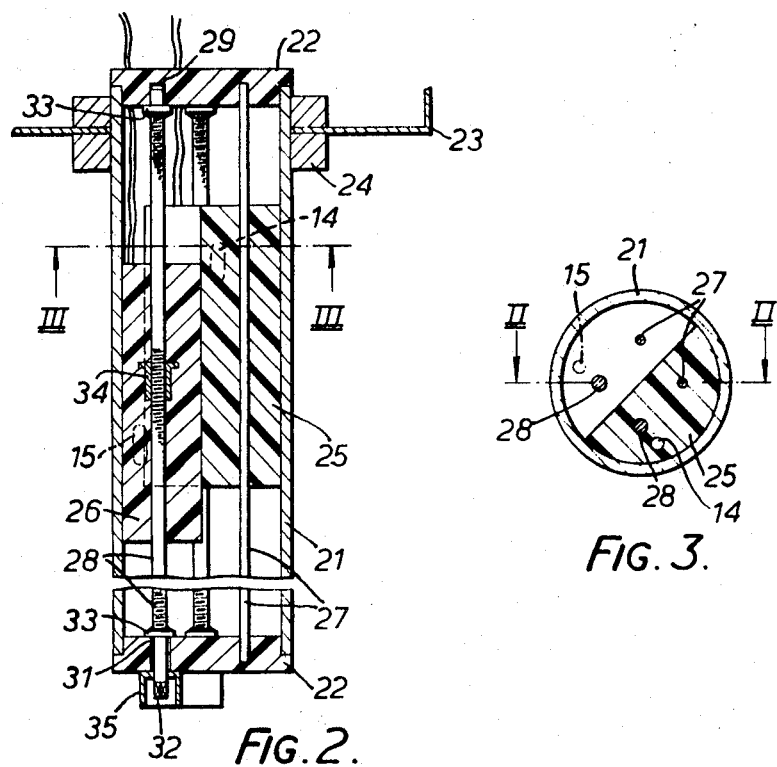
FIG. 2 is a section on the line II—II in FIG. 3 through the post in the detector in FIG. 1
Figure 3:
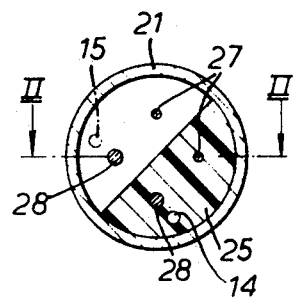
FIG. 3 is a section on the line III—III in FIG. 2 through the post.

As indicated in FIG. 2 the upper end of threaded rod 28 fits with clearance in a blind hole 29 in the upper bung 22 and passes with clearance through a hole 31 in the lower bung projecting beyond this bung to have a square end 32 for turning via a box spanner. The threaded rod 28 has a washer 33 brased at each end to locate it axially in relation to the post 16 and it also carries a flanged nut 34 which is molded within the glass fiber body so that as threaded rod 28 is turned about its axis the nut 34 and the body 26 carrying the magnet 15 can be adjusted longitudinally.

The lower ends of the threaded rods 28 are each protected by what is sometimes known as an Ellis nut 35, that is to say a rotatable sleeve around the square end 32 preventing access other than by a box spanner having a unique key arrangement so that only someone in possession of the particular key for that Ellis nut can adjust the position of the reed switch.

Thus it will remain in the position in which it is set when the lorry is first put into commission, but can be readily reset by an authorized person.

Electrical leads from the switch 15 lead through the molded body 26 and the upper bung 22 into the connection box 23 for connection to an electrical circuit including a battery and indicating lights in any desired arrangement.

The detector has the great advantage that it is simple to make and fit to an existing vehicle and there is no physical connection between the post 16 and the magnet embedded in the body 18 so that there is no joint to wear as the components move relatively to each other during normal transport as the spring deflects due to uneveness in the road.

During manufacture, the bodies 25 and 26 can be fairly easily formed in a mold in which the rods 27 and 28 are first fitted, the rod 28 carrying the nut 34, and before the plastic material has set the mold is opened and the reed switch 15 or 14 is pressed into the mold.

Glass fiber for the exposed ends of the tube 21 and for the body 18 carrying the magnet is particularly suitable as being free from corrosion and deleterious effects due to dirt and wet.

What we claim as our invention and desire to secure by Letters Patent is:

1. An axle load detector comprising a post carrying at least one magnetically operated switch at a local position along its length, a separate body incorporating a magnet for operating the switch and means for mounting the body and post, one on a vehicle chassis and one on an axle of the vehicle, the separate body being movable as the load on the axle increases through a range of positions in one of which the magnet operates the switch but in none of which is there physical contact between the post and the body.

2. A detector as claimed in claim 1 with the post mounted to be vertical on a vehicle chassis or axle and the body mounted on one of the axles and the chassis being movable along a vertical path close to the post as the axle spring progressively deflects.

3. A detector as claimed in claim 2 in which said switch is connected in an electrical indicating circuit or audible warning circuit.

4. A detector as claimed in claim 3 in which said switch is adjustable along the length of the post.

5. A detector as claimed in claim 4 in which said switch is on a carrier carried on a screw-threaded member extending within the post for adjustment by rotation of the thread.

6. A detector as claimed in claim 5 in which said switch is embedded in its carrier.

7. A detector as claimed in claim 6 in which one end of the post leads into a connection box which also constitutes the means for mounting the post.

8. A detector as claimed in claim 5 in which two switches are provided, the carrier for each switch being in the form of an elongated body of semicircular cross section so that the two carriers together form a cylinder.

9. A detector as claimed in claim 8 having means for adjusting the position of each switch along the length of the post, which means extend beyond the one end of the post.

10. A detector as claimed in claim 9 in which the extended end of the adjusting means is protected by a tamperproof cover requiring a key for adjustment.

11. In combination with a vehicle, a detector as claimed in claim 1 being mounted at each end of the vehicle front and rear axles.

12. In combination with a vehicle, a detector as claimed in claim 1 being mounted at the center of one of the vehicle axles.

* * * * *